(12) United States Patent
Cadet et al.

(10) Patent No.: US 12,159,351 B2
(45) Date of Patent: Dec. 3, 2024

(54) RENDERING OF A GUEST USER'S FACE FOR EXTERNAL DISPLAY

(71) Applicant: Apple Inc., Cupertino, CA (US)

(72) Inventors: Gilles M. Cadet, Agoura Hills, CA (US); Olivier Soares, Oakland, CA (US); Graham L. Fyffe, Playa Vista, CA (US); Yang Song, San Jose, CA (US); Shaobo Guan, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/375,058

(22) Filed: Sep. 29, 2023

(65) Prior Publication Data

US 2024/0331294 A1    Oct. 3, 2024

Related U.S. Application Data

(60) Provisional application No. 63/456,133, filed on Mar. 31, 2023.

(51) Int. Cl.
| | |
|---|---|
| *G06T 17/20* | (2006.01) |
| *G02B 27/01* | (2006.01) |
| *G06F 3/14* | (2006.01) |
| *G06T 13/40* | (2011.01) |
| *G06V 40/16* | (2022.01) |

(52) U.S. Cl.
CPC ............ *G06T 17/20* (2013.01); *G02B 27/017* (2013.01); *G06F 3/1431* (2013.01); *G06T 13/40* (2013.01); *G06V 40/165* (2022.01)

(58) Field of Classification Search
None
See application file for complete search history.

(56) References Cited

U.S. PATENT DOCUMENTS

| | | | |
|---|---|---|---|
| 9,959,678 B2 | 5/2018 | Katz et al. | |
| 10,394,315 B2 | 8/2019 | Yang et al. | |
| 10,495,882 B1 | 12/2019 | Badino et al. | |
| 10,726,584 B2 | 7/2020 | Trim et al. | |

(Continued)

FOREIGN PATENT DOCUMENTS

| | | |
|---|---|---|
| WO | 2022055742 A1 | 3/2022 |
| WO | 2022140658 A2 | 6/2022 |

OTHER PUBLICATIONS

Rekimoto et al., "Behind-the-Mask: A Face-Through Head-Mounted Display" (Year: 2018).*

(Continued)

*Primary Examiner* — Hilina K Demeter
(74) *Attorney, Agent, or Firm* — Thompson Hine LLP

(57) ABSTRACT

Various implementations disclosed herein include devices, systems, and methods that present a view of a device user's face portion, that would otherwise be blocked by an electronic device positioned in front of the face, on an outward-facing display of the user's device. The view of the user's face portion may be configured to enable observers to see the user's eyes and facial expressions as if they were seeing through a clear device at the user's actual eyes and facial expressions. Various techniques are used to provide views of the user's face that are realistic, that show the user's current facial appearance, and/or that present the face portion with 3D spatial accuracy, e.g., each eye appearing to be in its actual 3D position.

23 Claims, 3 Drawing Sheets

(56) References Cited

U.S. PATENT DOCUMENTS

| | | | |
|---|---|---|---|
| 10,782,537 B1* | 9/2020 | Chao | G02B 5/32 |
| 10,832,481 B2 | 11/2020 | Graham et al. | |
| 11,079,842 B2 | 8/2021 | Cancel Olmo et al. | |
| 11,210,832 B2 | 12/2021 | Ballagas et al. | |
| 11,462,000 B2 | 10/2022 | Meier et al. | |
| 11,579,693 B2 | 2/2023 | Hulbert et al. | |
| 11,736,679 B2 | 8/2023 | Matsuda et al. | |
| 11,740,742 B2 | 8/2023 | Wang et al. | |
| 11,743,064 B2 | 8/2023 | Cheung | |
| 11,822,736 B1 | 11/2023 | Shin et al. | |
| 11,830,628 B1 | 11/2023 | Thorn | |
| 11,861,255 B1 | 1/2024 | Ive et al. | |
| 2009/0202114 A1 | 8/2009 | Morin et al. | |
| 2012/0079378 A1 | 3/2012 | Goossens | |
| 2012/0139830 A1 | 6/2012 | Hwang et al. | |
| 2014/0085293 A1 | 3/2014 | Konoplev et al. | |
| 2014/0198121 A1 | 7/2014 | Tong et al. | |
| 2015/0253573 A1 | 9/2015 | Sako et al. | |
| 2016/0341959 A1* | 11/2016 | Gibbs | A63F 13/213 |
| 2017/0287217 A1 | 10/2017 | Kim et al. | |
| 2017/0352183 A1* | 12/2017 | Katz | G06T 19/006 |
| 2018/0004478 A1* | 1/2018 | Chen | A63F 13/26 |
| 2018/0060683 A1* | 3/2018 | Kontsevich | H04N 23/64 |
| 2018/0143442 A1* | 5/2018 | Gupta | A61M 21/00 |
| 2018/0158246 A1* | 6/2018 | Grau | G06T 3/18 |
| 2019/0082170 A1 | 3/2019 | Akahori | |
| 2019/0286406 A1 | 9/2019 | Chen | |
| 2020/0088999 A1 | 3/2020 | Wang | |
| 2020/0225734 A1 | 7/2020 | Magnusson et al. | |
| 2021/0281802 A1* | 9/2021 | Kirisken | H04N 7/15 |
| 2022/0350141 A1* | 11/2022 | Breugelmans | G02B 27/0149 |
| 2023/0015732 A1* | 1/2023 | Andall | G06F 3/011 |
| 2023/0418370 A1 | 12/2023 | Wu | |

OTHER PUBLICATIONS

Peng et al., "Human Face Reconstruction under a HMD occlusion" (Year: 2019).*

U.S. Patent and Trademark Office, Notice of Allowance, U.S. Appl. No. 18/375,204, 8 pages, Feb. 21, 2024.

U.S. Appl. No. 18/375,204, entitled "Rendering of Enrolled User's Face for External Display," Giles M. Cadet et al., 42 pages, filed Sep. 29, 2023.

U.S. Patent and Trademark Office, Notice of Allowance and Fee(s) Due, U.S. Appl. No. 18/375,204, 11 pages, Nov. 28, 2023.

Mai, C. et al., "Frontal Screens on Head-Mounted Displays to Increase Awareness of the HMD Users' State in Mixed Presence Collaboration," 10 pages, May 15, 2019, URL: https://arxiv.org/pdf/1905.06102.pdf.

* cited by examiner

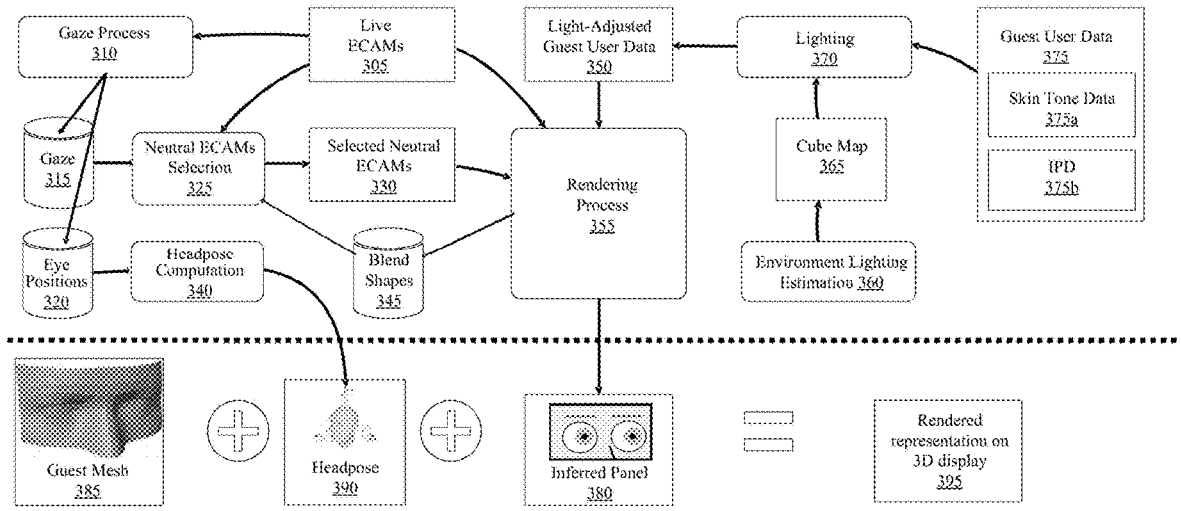
FIG. 3
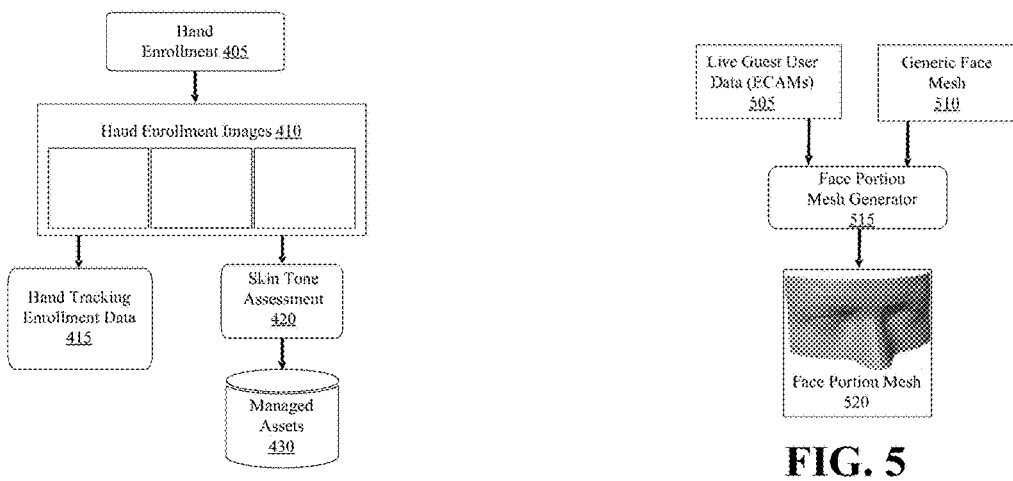
FIG. 4
FIG. 5

RENDERING OF A GUEST USER'S FACE FOR EXTERNAL DISPLAY

CROSS-REFERENCE TO RELATED APPLICATION

This application claims the benefit of U.S. Provisional Application Ser. No. 63/456,133 filed Mar. 31, 2023, which is incorporated herein in its entirety.

TECHNICAL FIELD

The present disclosure generally relates to electronic devices, and in particular, to systems, methods, and devices for representing users of electronic devices.

BACKGROUND

While a user uses an electronic device, the device may be in a position that blocks others around the user from seeing a portion of the user. For example, when a user holds a device up in front of their face or wears a device (e.g., such as a head-mounted device (HMD)), others in the same room/environment may not be able to see the eyes or other portions of the user's face.

SUMMARY

Various implementations disclosed herein include devices, systems, and methods that present a view of a device user's face portion (that would otherwise be blocked by an HMD, wearable electronic device, or other electronic device positioned in front of a user's face) on an outward-facing display of the device. Displaying the user's face portion may be configured to enable observers to see the user's current eyes and facial expressions as if they were seeing through a clear device at the user's actual eyes and facial expressions. Various techniques are used to provide views of the user's face that are realistic, that show the user's current facial appearance, and/or that present the face portion with 3D spatial accuracy, e.g., each eye appearing to be in its actual 3D position for different observation viewpoints around the user.

Some implementations enable display of a user's face portion for a user who has not previously performed an avatar or other face-focused enrollment process that might otherwise provide facial information useful in displaying the user's face portion. A user who has not yet performed an avatar or other face-focused enrollment process is referred to herein as a "guest" user. A guest user may or may not be the owner of a device and may or may not have completed other enrollment processes (e.g., hand enrollment, etc.) but has not yet performed an avatar or other face-focused enrollment process. The techniques disclosed herein may be used for both guest and non-guest users but may be particularly useful to guest users for whom face-focused enrollment data is not available to aid in providing a view of a face portion of the user on an outward-facing display.

Some implementations disclosed herein combine a first set of data (e.g., live data based on live eye camera data) with a second set of data, e.g., guest data such as interpupillary distance (IPD) obtained from device setting information and skin tone from hand enrollment or other external sensor sources (e.g., live or previously captured hand data). Skin tone refers to the color or texture of the surface of a user's skin. Such first and second data may be combined to produce an image/panel with texture/color data that can be applied to a 3D mesh of the user's face portion. The textured 3D mesh may be used to display a view of the face portion on an external display of the device. Guest data may be used as a substitute for data from an avatar or other face-focused enrollment, e.g., when such face-focused enrollment data is not available. The view may be provided based on mapping a 2D output (e.g., an image/panel) to a 3D mesh and then providing the view of the mesh based on an observer viewpoint so that the eyes appear to the observer to be in their actual 3D positions.

In general, one innovative aspect of the subject matter described in this specification can be embodied in methods performed at an electronic device having a processor. Such a method may involve obtaining first data corresponding to a current appearance of a face portion, e.g., live eye camera or other sensor data depicting each eye and other face areas captured while the user wears an HMD. The first data may be based on first sensor data captured live via one or more sensors, such as one or more inward and/or outward-facing sensors on an HMD that capture IR or color images, depth data, motion data, etc. corresponding a user's face or other body portions.

The method further obtains second data corresponding to additional attributes of the user, such as a skin tone and an interpupillary distance (IPD) of the user. Skin tone may provide information about the user that is not captured as well in the first data, e.g., skin tone determined from RGB color images of the user's hand(s) may enable more accurate prediction of the skin tone of the user's face portion than infrared (IR) data from internal cameras capturing IR images of the user's eye regions. In one example, user skin tone is determined from hand enrollment images and such skin tone information is not captured as well by IR eye cameras (ECAMs). An IPD value may be tracked by the device for other purposes, e.g., for displaying content to the user, and may also be used as the second data to facilitate a more accurate representation of the face portion of the user on an external display.

The method generates a representation of the face portion based on the first data and the second data. For example, in some implementations, this may involve a rendering neural network (or other machine-learning model) that inputs first data that includes live eye camera data and second data that includes a skin tone value and an IPD value. The machine-learning model may output an image representing the current appearance of the face portion with the appearance attribute. The machine-learning model may also output a 3D mesh representing a 3D shape of the face portion of the user. The machine learning model may output multiple constructs (e.g., both a texture image/panel and a 3D mesh) or a single construct (e.g., a 3D representation of both texture and 3D shape such as an RGB-D representation or 3D mesh with associated texture values).

The method presents the representation of the face portion on an outward-facing display of the wearable electronic device. The presenting may involve mapping texture from a 2D face representation onto a 3D face model (e.g., a 3D mesh). The presenting may involve displaying a view of a textured 3D mesh on the front of the device. The view displayed on the outward-facing display may display the eyes to appear to be at their accurate 3D positions by displaying content based on an observation viewpoint/direction. Views for multiple observation viewpoints/directions may be displayed e.g., using a lenticular display to present multiple views that are each only visible from particular and corresponding observation viewpoints/directions.

The outward-facing display may be a flat planar display, a flat curved display, or have any other shape, and the view that is presented may account for that display shape.

A view may depict the current appearance of eyes and surrounding areas that would otherwise be blocked by the device. If the device is moved (e.g., up and down on the user's face), the eyes appear to stay in the same positions corresponding to their actual positions as the view adjusts accordingly.

The representation may also be adjusted to limit contrast between the sclera and skin to avoid artifacts, e.g., ensuring that white eye portions do not appear significantly whiter than light skin areas to avoid an appearance of brighter-than-real eyes or other objectionable appearance.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a process flow chart illustrating an exemplary rendering technique in accordance with some implementations.

FIG. 4 is a process flow chart illustrating an exemplary hand enrollment technique in accordance with some implementations.

FIG. 5 is a process flow chart illustrating an exemplary process for generating a face portion mesh in accordance with some implementations.

Figure 1:
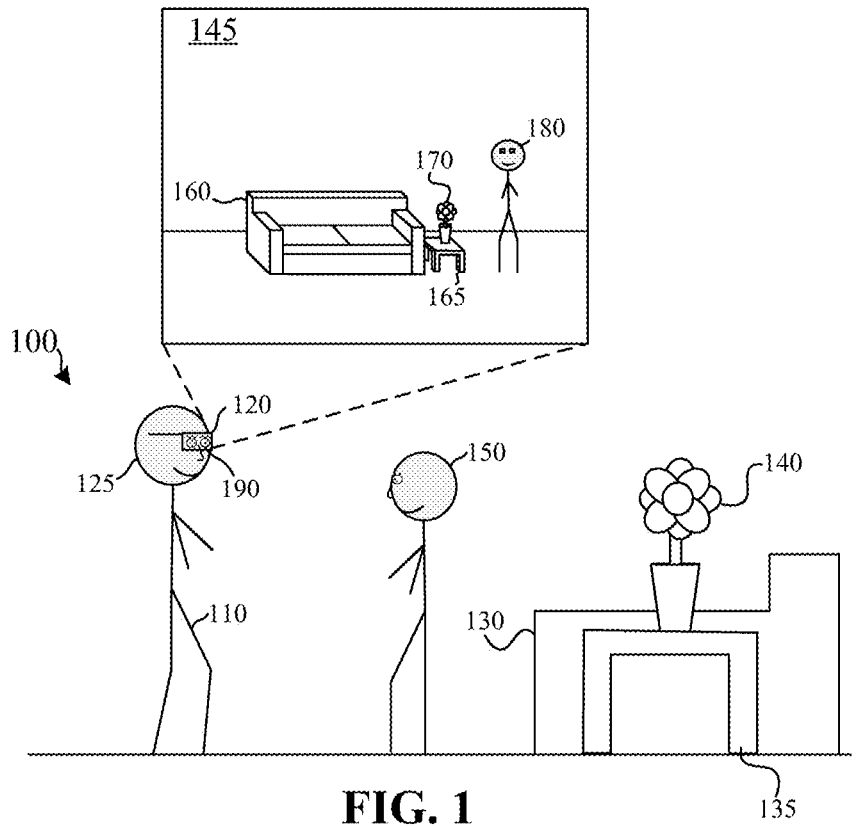
FIG. 1 illustrates an environment with a device presenting a view of a face portion of a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example physical environment 100 (e.g., a room) including a device 120. In some implementations, the device 120 displays content to a user 110, e.g., extended reality (XR) content. For example, content may include representations of the physical environment 100 (e.g., passthrough video) and/or virtual content, e.g., user interface elements such as menus, buttons, icons, text boxes, graphics, avatars of another device user, etc. In the example of FIG. 1, the environment 100 includes another person 150, a couch 130, a table 135, and flowers 140, and the device 120 displays a view 145 to user 110 on one or more internal displays. The view 145 includes a depiction 160 of the couch 130, a depiction 165 of the table 135, a depiction 170 of the flowers 140, and a depiction 180 of the other person 150.

In some implementations, the device 120 includes virtual content (not shown) in the view 145. Such virtual content may include a graphical user interface (GUI). In some implementations, the user 120 interacts with such virtual content through virtual finger contacts, hand gestures, voice commands, use of an input device, and/or other input mechanisms. In some implementations, the virtual content enables one or more application functions including, but not limited to, image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

While this example and other examples discussed herein illustrate a single device 120 in a real-world environment 100, the techniques disclosed herein are applicable to multiple devices performing some or all of the functions. In some implementations, the device 120 is a wearable electronic device such as an XR headset, smart-glasses, or other HMD, as illustrated in FIG. 1. In some implementations, the device 120 is a handheld electronic device (e.g., a smartphone or a tablet) held or otherwise positioned in front of the user's face. In some implementations the device 120 is a laptop computer or a desktop computer held or otherwise positioned in front of the user's face.

The device 120 obtains image data, depth data, motion data, and/or other sensor data associated with the user 110 and/or the physical environment 100 via one or more sensors. For example, the device 120 may obtain infrared (IR) images of a portion of the user's head 125 from one or more inward-facing infrared cameras while the device 120 is being worn by the user 110. In some implementations, the sensors may include any number of sensors that acquire data relevant to the appearance of the user 110. For example, when wearing an HMD, one or more sensors (e.g., cameras inside the HMD) may acquire images associated with the eyes and surrounding areas of the user and one or more sensors on the outside of the device 120 may acquire images associated with the user's body (e.g., hands, lower face, forehead, shoulders, torso, feet, etc.) and/or the physical environment 100.

In some implementations, the device 120 includes an eye imaging and/or eye tracking system for detecting eye position and eye movements via eye gaze characteristic data. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 120 may emit NIR light to illuminate the eyes of the user 110 and the NIR camera may capture images of the eyes of the user 110. In some implementations, images captured by the eye tracking system may be analyzed to detect position and movements of the eyes of the user 110, or to detect other information about the eyes such as appearance, shape, state (e.g., wide open, squinting, etc.), pupil dilation, or pupil diameter. Moreover, the point of gaze estimated from the eye tracking images may enable gaze-based interaction with content shown on one or more near-eye displays of the device 120.

In some implementations, the device 120 includes a hand tracking system for detecting hand position, hand gestures/configurations, and hand movements via hand tracking data. For example, the device 120 may include one or more outward-facing cameras, depth sensors, or other sensors that capture sensor data from which a user skeleton can be generated and used to track the user's hands. Hand tracking information, e.g., gestures, and/or gaze tracking data may be used to provide input to the device 120.

The device 120 uses sensor data (e.g., live and/or previously-captured) to present a view 190 depicting a face portion of the user 110 that would otherwise be blocked by the device 120. The view 190 is presented on an outward-facing display of the user's device 120 and may be visible to the other person 150. The other person 150 may observe the view depicting the face portion of user 110 to see a relatively accurate representation of the current and moving face portion of the user 110. The view may be aligned to provide 3D accuracy, e.g., such that the other person 150 sees the face portion of the user 110 with face portion appearing in its actual 3D position, e.g., as if a front area of the device 120 were transparent and the other person were viewing the face of the user 110 directly through the transparent area.

Figure 2:
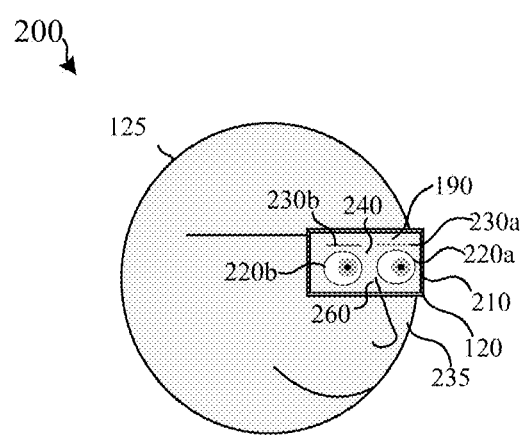
FIG. 2 illustrates an enlarged visualization of the head of the user and the device of FIG. 1, in accordance with some implementations.

FIG. 2 provides an enlarged illustration of the head of the user 110 and the device 120 of FIG. 1. As illustrated, the device 120 includes an outward-facing display 210 (e.g., on the front surface of device 120 and facing outward away from the eyes of the user 110. The outward-facing display displays content to one or more other persons in the physical environment 100). In some implementations, the display 210 is only activated to display content (e.g., the user's face portion) when one or more other persons are detected within the physical environment 100, detected within a particular distance or area, detected to be looking at the device 120, or based on other suitable criteria.

The display 210 presents view 190, which in this example includes a depiction 220a of a left eye of the user 110, a depiction 220b of a right eye of the user 110, a depiction 230a of the left eyebrow of the user 110, a depiction 230b of the right eyebrow of the user 110, depiction 240 of skin around/near the eyes of the user 110, and depiction 260 of an upper nose portion of the user 110, etc. The view 190 provides depictions of a face portion that would otherwise be blocked from view by the device 120. The display of the user's face portion may be configured to enable observers (e.g., the other person 150) to see the user's current eyes and facial expressions as if the person 150 were seeing through a clear device at the actual eyes and facial expressions of user 110.

The view 190 may be updated over time, for example, providing a live view of the appearance of the face portion of the user such that the person 150 sees the eyes and facial appearance/expressions of the user 110 changing over time. The display may provide what appears to be live video of the user's face portion. Accordingly, such a live updated view 190 may be based on live updated sensor data, e.g., capturing inner camera data signal over time and repeatedly updating the representation of the face portion for each point in time, e.g., every frame, every 5 frames, every 10 frames of the display cycle.

The view 190 of the user's face portion may be configured to be realistic and correspond to the user's current appearance. This may be achieved or facilitated, for example, by utilizing both live data corresponding to the current appearance of the face portion and other information about the appearance of the user's face portion. In one example, skin tone data that is not as available from live, inward-facing sensors is obtained from other user data (e.g., previously obtained or obtained via other sources). For example, hand enrollment data corresponding to skin tone or other skin attributes (e.g., from a hand enrollment prior to the live experience) and live data are combined to provide a view of the user's face portion. The live data may provide information about the current state of the face portion while the enrollment data may provide information about one or more attributes of the face portion that are un-attenable or not captured as well in the live environment (e.g., corresponding to portions of the face portion that are blocked from live sensor capture by the device being worn or corresponding to color, 3D shape, or other elements of the face portion that are not captured or depicted as accurately by the live sensors). In another example, skin tone data may be generated live, in real-time by outward facing cameras, for example, a guest user is gesturing with their hands, and such data is used to provide a view of a user's face portion.

In one example, prior hand enrollment data is captured during a relatively brief hand enrollment that is automatically initiated and/or required when a guest user first puts on the device. A guest user may perform a hand enrollment so that hand tracking and hand-based input will be enabled and then access the device without having to conduct an additional (and potentially relatively lengthy) avatar/face-focused enrollment process. This may be appropriate in a variety of circumstances, e.g., where a guest user wants to try out a device in a retail store selling the device, where a guest user wants to try out a friend's device, where time or other constraints cause a device owner guest user to want to access their device before conducting up avatar/face-focused enrollment, and various other scenarios.

The view 190 of the user's face portion may be configured to present the face portion with 3D spatial accuracy, e.g., each eye appearing to be in its actual 3D position for different observation viewpoints around the user. This may involve determining a 3D appearance of the face portion (e.g., mapping an image of the face portion onto a 3D model of the face portion) and providing a view of the 3D appearance of the face portion for a particular observer viewpoint/direction, e.g., based on the relative positioning of the other person 150. The view may be provided based on mapping combined data (e.g., first data representing the current appearance of the user's face portion based on live sensor data and second data representing other data such as previously-captured data and/or device provided data). A representation of the texture of the user's face may be mapped to a 3D mesh and then a view of the 3D mesh provided on an external display. The view may be based on an observer viewpoint so that the eyes appear to an observer at that viewpoint in their actual 3D position. The shape of the display 210 and/or its position relative to the user 110 (e.g., where it is on the user's face) may be used in providing the view so that the eyes and surrounding areas appear to be spatially accurate.

FIG. 3 is a process flow chart illustrating an exemplary rendering technique. In this example, a rendering process 355 receives various inputs and outputs a representation of a face portion of the user, i.e., inferred panel 380. The rendering process 355 may be implemented as an algorithm or a machine learning model such as a neural network that is trained to produce an inferred panel, a 3D mesh, and/or other such representations based on the combined inputs. Such a network may use training data that provides accurate depictions of current face portions corresponding to training input data, e.g., actual or synthetically-generated renderings of the training face portions mimicking sensor captured-data.

In the example of FIG. 3, the rendering process 355 receives input that includes a light adjusted guest user data 350, which may be generated based on guest user data 375, e.g., skin tone data 375a corresponding to a user's skin tone and/or IPD data corresponding to the user's IPD. In some implementations, during a hand enrollment process (e.g., on the same or different device), the user is guided to perform various hand gestures or otherwise to position their hands in view of one or more of the device's sensors while wearing (or not wearing) the device. For example, the user may be guided to hold their hands up in front of themselves, first, with palms facing away, and then, with palms facing towards outward-facing sensors on the device. An initial purpose of such an enrollment may be to identify physical/model parameters of the hands or fingers, e.g., bone lengths, to facilitate hand-based input recognition or hand tracking. The outward-facing sensors may capture data of a type or quality that inward-facing sensors on the device do not. For example, inward-facing sensors on the device may be IR cameras while the outward-facing sensors may capture color image data not captured by the IR cameras.

In FIG. 3, at runtime/rendering time, an environment lighting estimation 360 is performed by the device, e.g., determining the locations of one or more light sources in the environment and/or the directions relative to the device/user of light in the environment. In this example, the lighting estimation is used to provide a cube map 365 representing the lighting which is used at lighting block 370 to generate a light-adjusted guest user data (e.g., corresponding to an appearance of the user's skin tone in the current lighting condition represented by the cube map 365).

The rendering process 355 uses the light-adjusted user data (e.g., skin tone and/or IPD data) as input in producing the inferred panel 380.

In FIG. 3, the rendering process 355 also uses eye camera data which may be based at least in part on live sensor data, e.g., sensor data being currently captured during the user's wearing of the device and the presentation of a view of the face portion on an external display of the device. In this example, live ECAMS (i.e., eye cameras) capture sensor data (e.g., IR images) of parts of the user's face that are inside and not covered by the device while the device is being worn by the user. Such parts of the user face may, but do not necessarily, include the user's eyes, eye lids, eyebrows, and/or surrounding facial areas but do not include areas of the face that are covered by portions of the device contacting the user's face (e.g., the device's light seal). Live ECAM data may be captured by the live ECAMS 305 for multiple purposes, e.g., for use in tracking the user's gaze for input and/or other purposes as well as for generating a view of the user's face portion for display on an external display of the device. Using the same eye region sensors for multiple purposes may improve device efficiency and enhanced performance properties.

In the example of FIG. 3, the live ECAMs 305 provide sensor data (e.g., IR images of each of the eyes and surrounding areas) to the rendering process 355 as well as to a gaze process 310 and a neutral ECAMs selection 325 block. The gaze process 310 uses the data from the live ECAMS 305 to determine eye characteristics such as gaze 315 (e.g., gaze direction) and/or eye positions 320 (e.g., 6DOF eye ball poses). The gaze 315 is used by neutral ECAMs selection 325 block, along with the data from the live ECAMS 305, to produce selected neutral ECAMs 330, which provide data e.g., image data corresponding to neutral eye state in which the eye is open and looking straight forward.

The rendering process 355 may produce inferred panel 380 and/or blendshapes. Blendshapes may represent facial features and/or expressions. In one example, blendshapes represent a detected facial expression. In one example, blendshapes use a dictionary of named coefficients representing the detected facial expression in terms of the movement of specific facial features. The neutral ECAMs selection 325 block may use gaze 315 and/or the blendshapes 345 to compute information such as a neutral score. In some implementations, at each frame, the neutral ECAMs are replaced by the live ECAMS 305 each time the neutral score is improved.

The live ECAMs 305 data and the selected neutral ECAMs 330 data is used by the rendering process 355 in producing the inferred panel 380. In this example, the rendering process receives input including the light-adjusted guest user data 350, live ECAMs 305 data, and selected neutral ECAMs 330 data, and produces an inferred panel 380 as at least one of its outputs. In some implementations, the live ECAMs 305 data and selected neutral ECAMs 330 data is compared to estimate a difference, e.g., how much and/or how features in the live ECAMs 305 data differ from the same features in the selected neutral ECAMs 330 data. This may involve identifying such features in corresponding eye images from each set of data and determining amounts of movement/difference between their locations. In some implementations, the rendering process 355 is a neural network or other machine learning model that accounts for such differences (e.g., implicitly without necessarily being explicitly trained to do so) in producing inferred panel 380.

In the lower portion of FIG. 3, the inferred panel 380 produced by the rendering process 355 is combined with other data to produce a rendered representation on a display 395. In this example, the inferred panel 380 is applied to add color/texture to a guest mesh 385 (e.g., a 3D model of the face portion). Such a mesh may be output from the rendering process 355 (e.g., a single machine learning model produces both 2D texture and 3D mesh) or via a separate process, such as is described with respect to FIG. 5 below.

Headpose 390 information may also be determined, for example, by headpose computation 340 block using eye position data and/or other data such as IMU data, SLAM data, VIO data, etc. to determine a current headpose 390.

Such a headpose may identify position and/or orientation attributes of the device/user's head, e.g., identifying a 6DOF pose of the user's head. Headpose 390 may be used to determine where to spatially position the textured 3D mesh (combination of guest mesh 385 with inferred panel 380) in relation to the user's head/device 3D position for rendering purposes, e.g., where the face portion is positioned in a 3D space relative to a viewpoint position/direction for rendering purposes.

A 3D position or viewpoint direction of an observer may be estimated and used in producing the rendered representation of the face portion on the 3D display 395. An observer may see an image of the face portion displayed on an external 2D display of the device, e.g., on a flat or curved-flat front surface such that each of the displayed eyes and other areas of the face portion appear to be at locations at which they would appear if the device were see-through (e.g., having a transparent front) and the observer was observing the user's actual face.

In some implementations, the display provides different views for different observer viewpoints, e.g., using a lenticular display that displays images (e.g., 10+, 15+, 25+, etc. images) for different observer viewpoints such that, from a given viewpoint an observer, views an appropriate view, e.g., with the displayed face portion's 3D position appearing to match the corresponding actual face portion's actual current position. In such a configuration, an observer's actual viewpoint need not be determined since the observer will view an appropriate image for their current viewpoint based on the characteristics of the display device.

The rendering process of FIG. 3 can be repeated over time, for example, such that an observer sees what appears to be a live 3D video of the user's face portion including eye movements and facial expression changing over time on an external display of the device.

In one example, the live ECAMs 305 data is received as a series of frames and the rendering process 355 produces an inferred panel 380 that is used to display an updated rendered representation of the face portion on the 3D display 395 for each eye data frame. In other implementations, the rendered representation 395 is updated less frequently, e.g., every other eye data frame, every $10^{th}$ eye data frame, etc.

Some of the data in the process need not be updated during the live rendering. For example, guest user data 375 may be used for multiple frames, e.g., for all frames, during the live rendering of the face portion. In this example, the lighting 370 may use that static data (i.e., skin tone data 375$a$ and IPD 375$b$) based on current environment lighting estimation 360 that may or may not be updated during the live rendering. In one example, the environment lighting estimation 360 and lighting 370 occur just once at the beginning of a user experience or periodically. In another example, the lighting estimation 360 and lighting 370 occurs during every frame of data capture during a user experience. In other examples, these processes occur periodically and/or based on detecting conditions (e.g., lighting) changing above a threshold during a user experience.

The guest mesh 385 similarly need not be updated during the live rendering. The same guest mesh 385 may be used for rendering a rendered representation 395 for each of multiple frames during a user experience. In another implementation, a guest mesh 385 is updated during the user experience, e.g., via an algorithm or machine learning process, that uses live data to modify a guest mesh 385 before applying the current inferred panel 380.

FIG. 4 is a process flow chart illustrating an exemplary hand enrollment technique. In this example, hand enrollment process 405 captures hand enrollment images 410. In some implementations, this involves a device worn by a user guiding the user to position one or both hands in view of an outward-facing camera, e.g., in one or more hand poses, while the hand enrollment images 410 are captured. The hand enrollment images 410 may be used as hand tracking enrollment data, e.g., to customize hand tracking based on the size, shape, bone lengths, and/or other characteristics of the user's hand(s).

The hand enrollment images 410 may additionally (or alternatively) be used to determine appearance attributes of the user's hand such as one or more colors and/or textures associated with the user's skin (e.g., skin tone). In some implementations, a skin tone assessment 420 uses images of a user's hand to predict a skin tone of a user's face (or specific portion of the user's face). A user's hand skin tone may differ from the user's face skin tone, but may still be used to predict that face skin tone. In some implementations, a machine learning model is trained with images of both hands and face (ground truth) of sample data subjects to make predictions about face skin tone using only hand image input. In some implementations, the input image data (e.g., of the user's hands) is masked to exclude non-user content.

Skin tone may additionally (or alternatively) be estimated and/or refined based on images of the user's cheeks, shoulders, torso, arms, legs, etc. captured by outward-facing sensors on a device.

The skin tone assessment 410 produces guest user data that is stored as a managed asset for use in rendering a face portion of the user, e.g., via the rendering process 355 of FIG. 3. The rendering process 355 may use skin tone data to predict the texture (e.g., color) of the user's facial skin, eye color, eye brow/lashes color, and other facial attributes. In one example, the color/texture of features depicted in ECAM images (which may not include color/texture) are predicted by a neural network or other machine learning model (e.g., a neural network used in the rendering process of FIG. 3).

FIG. 5 is a process flow chart illustrating an exemplary process for generating a face portion mesh. In this example, live guest user data (e.g., ECAM images) 505 and a generic user face mesh 510 are used as input together to a face portion mesh generator 515 that produces face portion mesh 520 that has a 3D mesh intended to correspond to the shape of the corresponding portion of the user's face. Such a face portion mesh 520 may be used in rendering a face portion of the user, e.g., it may be used as the guest mesh 385 of the rendering process of FIG. 3.

The generic mesh 510 used in such a process may be selected from a set of generic meshes based on one or more user characteristics, e.g., IPD, eye cam data, etc. For example, a generic mesh corresponding to the user's approximate head size/shape may be selected based on an IPD value of the user. In another example, a 3D eye geometry is available via a device eye tracking system and used to determine a generic mesh to use as a starting point for a user-specific mesh.

Figure 6:
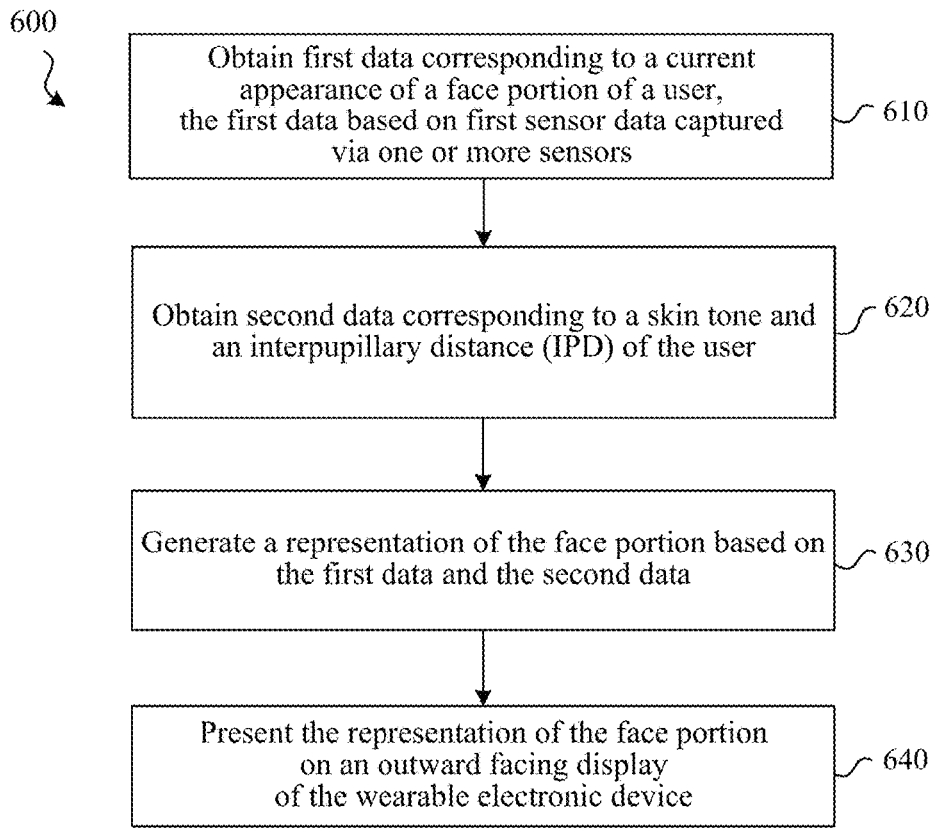
FIG. 6 is a flowchart representation of a method for presenting a view of a device user's face portion in accordance with some implementations.

FIG. 6 is a flowchart representation of a method 600 for presenting a view of a device user's face portion. In some implementations, a device (e.g., device 120 of FIG. 1) performs the techniques of method 600. In some implementations, the techniques of method 600 are performed on a mobile device, desktop, laptop, HMD, or other wearable electronic device. In some implementations, the method 600 is performed by processing logic, including hardware, firmware, software, or a combination thereof. In some implementations, the method 600 is performed on a processor executing code stored in a non-transitory computer-readable medium (e.g., a memory).

At block 610, the method 600 obtains first data corresponding to a current appearance of a face portion, the first data based on first sensor data captured via one or more sensors. In one example implementation, the first data comprises one or more inward-facing cameras, e.g., ECAM, facing each eye and surrounding areas of the user's face within an HMD display area while the HMD is being worn by a user. Such cameras may be color, black and white, IR, or any other appropriate camera type.

At block 620, the method 500 obtains second data corresponding to a skin tone and/or an interpupillary distance (IPD). Skin tone may be based on one or more images of a non-face portion of the user, such as the user's hands. Such data may be captured during a non-face enrollment, e.g., during a hand enrollment process. Skin tone may provide information about the user that is not captured as well in the first data, e.g., skin tone determined from RGB color images of the user's hand may enable more accurate prediction of the skin tone of the user's face portion than infrared data from internal cameras capturing IR images of the user's eye regions. In one example, user skin tone is determined from hand enrollment images, which is not captured as well by the ECAM IR cameras. The second data may correspond to a portion of the face portion not depicted in the first sensor data, e.g., the user's cheeks, forehead, etc.

An IPD value may be tracked by the device for other purposes, e.g., for displaying content to the user, and may also be used as the second data to facilitate a more accurate representation of the face portion of the user on an external display.

A 3D representation (e.g., a 3D mesh) representing a 3D shape of the face portion may also be obtained.

At block 630, the method 600 generates a representation of the face portion based on the first data and the second data. For example, this may involve a rendering process (e.g., algorithm, machine learning model such as a neural network) that inputs the first data (e.g., imputing live and selected neutral ECAM data) and the second data, and outputs an inferred panel representing the current appearance of the face portion with an appearance attribute (e.g., skin tone, IPD) of the second data. This may involve comparing the live first data with the neutral data (which may be derived from live and/or prior data) to extract motion and using that motion to produce a representation that has an appearance attribute derived from the second data, e.g., a representation such as an inferred panel 380 of FIG. 3.

Generating the representation of the face portion may involve inputting the first data and the second data to a neural network trained to output a 3D mesh representing a shape of the face portion and an image representing a texture of the face portion.

Generating the representation may involve a rendering process 355 producing an inferred panel 380 as described with respect to FIG. 3. Generating the representation of the face portion may involve inputting the first data and the second data to a neural network trained to output the representation of the face portion. Generating the representation of the face portion may involve determining a change (e.g., movement) based on live eye camera data and neutral eye camera data.

At block 640, the method 600 presents the representation of the face portion on an outward-facing display of the wearable electronic device. The representation (such as inferred panel 380) may be mapped to a 3D face representation (e.g., guest mesh 385) and displayed on the front of the device, e.g., on an outward-facing display of an HMD. The view displayed on the outward-facing display may display the eyes to appear to be at their accurate 3D positions by displaying content based on a position of an observer. A lenticular display may be used to present 29 views of the face portion for different observer viewpoints/directions. The outward-facing display may be a flat curved display. The outward-facing display may depict the current appearance of eyes and surrounding areas that would otherwise be blocked by the device. If the device is moved (e.g., up and down on the user's face), the eyes and other parts of the face portion will appear to stay in the same positions corresponding to their actual positions. The representation may also be adjusted to limit contrast between the eye sclera and the user's skin to avoid artifacts or undesirable visual effects.

Presenting the representation of the face portion on the outward-facing display of the wearable electronic device may involve generating a live 3D face portion representation by mapping the representation to a 3D representation of the face portion and generating a view from a viewpoint of the live 3D face portion representation from a viewpoint.

The view may depict content such that a viewer at the viewpoint observes the eyes and surrounding portions of the face portion in 3D positions corresponding to their actual 3D positions.

The method 600 may provide different views of the face portion over time based on a changing position of an observer. The viewpoint may be determined based on determining a relative position of an observer to the wearable electronic device.

Multiple views corresponding to different viewpoints may be provided via a lenticular display.

The method 600 may be provided only when the device is being operated by a user who has not previously completed a face/avatar enrollment. For example, method 600 may involve determining that the user is not associated with a user appearance enrollment for the device and, in accordance with determining that the user is not associated with a user appearance enrollment, determining to use the second data corresponding to the skin tone and the interpupillary distance (IPD) of the user instead of data that would otherwise be available for users after user appearance enrollment.

Figure 7:
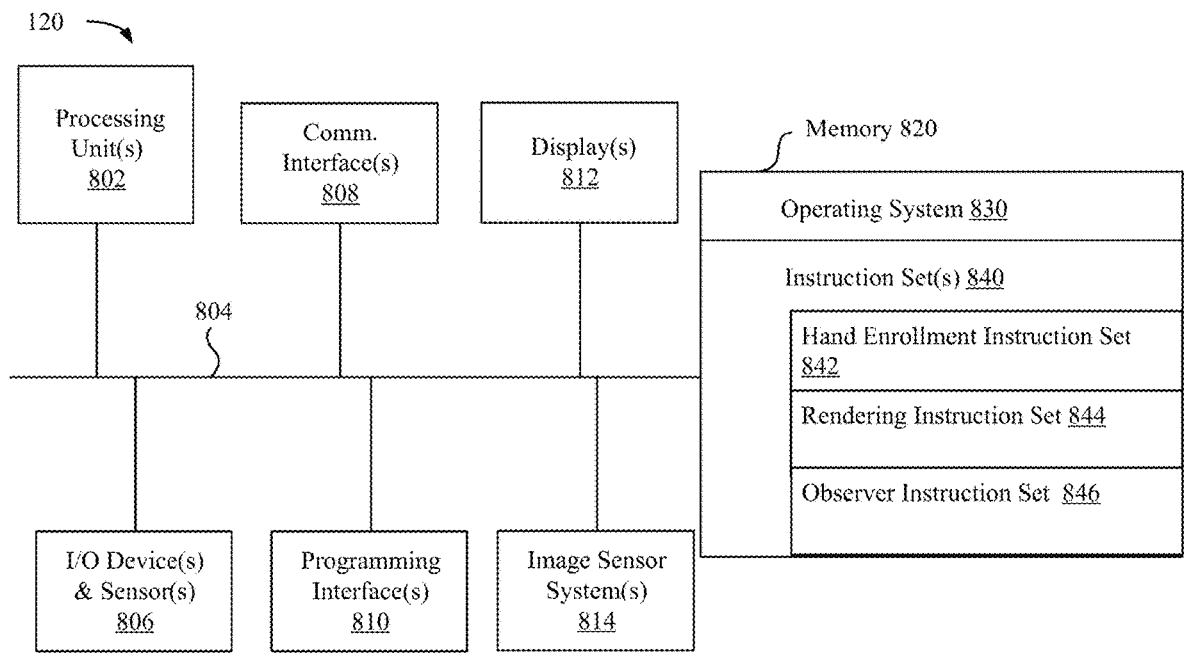
FIG. 7 is a block diagram illustrating device components of an exemplary device according to some implementations.

FIG. 7 is a block diagram of an example device 120. Device 120 illustrates an exemplary device configuration for devices described herein (e.g., device 10, etc.). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 10 includes a single display. In another example, the device 10 includes a display for each eye of the user.

In some implementations, the one or more image sensor systems 814 are configured to obtain image data that corresponds to at least a portion of the physical environment 105. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a hand enrollment instruction set 842, a rendering instruction set 844, and an observer instruction set 846. The instruction set(s) 840 may be embodied a single software executable or multiple software executables.

In some implementations, the hand enrollment instruction set 842 is executable by the processing unit(s) 802 to generate hand enrollment data from image data. The enrollment instruction set 842 may be configured to provide instructions to the user in order to acquire image information and determine whether additional image information is needed. To these ends, in various implementations, the instruction includes instructions and/or logic therefor, and heuristics and metadata therefor.

In some implementations, the rendering instruction set 844 is executable by the processing unit(s) 802 to generate and display a representation of a face portion of a face based on the live and/or previously-obtained sensor data. To these ends, in various implementations, the instruction includes instructions and/or logic therefor, and heuristics and metadata therefor.

In some implementations, the observer instruction set 846 is executable by the processing unit(s) 802 to determine whether an observer is present and/or to determine an observation viewpoint/direction of such an observer. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a wearable electronic device having a processor:
      obtaining first data corresponding to a current appearance of a face portion of a user, the first data based on first sensor data captured via one or more sensors;
      determining that the user is different than another user associated with a user appearance enrollment for the device;
      in accordance with determining that the user is different than the another user associated with a user appearance enrollment for the device, determining to use second data corresponding to a skin tone value and an interpupillary distance (IPD) value of the user;
      obtaining the second data corresponding to the skin tone value and the IPD value of the user;
      generating a representation of the face portion based on the first data and the second data; and
      presenting the representation of the face portion on an outward-facing display of the wearable electronic device.

2. The method of claim 1, wherein the skin tone value is based on one or more images of hands of the user.

3. The method of claim 2, wherein the one or more images of the hands are captured during a hand enrollment.

4. The method of claim 1, wherein the second data corresponds to a portion of the face portion not depicted in the first sensor data.

5. The method of claim 1, wherein generating the representation of the face portion comprises inputting the first data and the second data to a neural network trained to output a 3D mesh representing a shape of the face portion and an image representing a texture of the face portion.

6. The method of claim 5 further comprising inputting live eye camera data and neutral eye camera data to the neural network.

7. The method of claim 6, wherein generating the representation of the face portion comprises determining a change based on the live eye camera data and the neutral eye camera data.

8. The method of claim 5, wherein presenting the representation of the face portion on the outward-facing display of the wearable electronic device comprises:
   generating a live 3D face portion representation by mapping the image to the 3D mesh; and
   generating a view from a viewpoint of the live 3D face portion representation from a viewpoint.

9. The method of claim 8, wherein the view depicts the view such that a viewer at the viewpoint observes the eyes and surrounding portions of the face portion in 3D positions corresponding to their actual 3D positions.

10. The method of claim 8, wherein the viewpoint is determined based on determining a relative position of an observer to the wearable electronic device.

11. The method of claim 1 further comprising providing different views of the face portion over time based on a changing position of an observer, wherein the wearable electronic device provides the views via a lenticular display.

12. The method of claim 1, wherein the wearable electronic device comprises a head mounted device (HMD) that blocks a direct view the face portion when the electronic device is being worn.

13. A wearable electronic device comprising:
    a non-transitory computer-readable storage medium;
    one or more sensors; and
    one or more processors coupled to the non-transitory computer-readable storage medium, wherein the non-transitory computer-readable storage medium comprises program instructions that, when executed on the one or more processors, cause the one or more processors to perform operations comprising:
       obtaining first data corresponding to a current appearance of a face portion of a user, the first data based on first sensor data captured via one or more sensors;
       determining that the user is different than another user associated with a user appearance enrollment for the device;
       in accordance with determining that the user is different than the another user associated with a user appearance enrollment for the device, determining to use second data corresponding to a skin tone value and an interpupillary distance (IPD) value of the user;
       obtaining the second data corresponding to the skin tone value and the IPD value of the user;
       generating a representation of the face portion based on the first data and the second data; and
       presenting the representation of the face portion on an outward-facing display of the wearable electronic device.

14. The wearable electronic device of claim 13, wherein the skin tone value is based on one or more images of hands of the user.

15. The wearable electronic device of claim 14, wherein the one or more images of the hands are captured during a hand enrollment.

16. The wearable electronic device of claim 13, wherein the second data corresponds to a portion of the face portion not depicted in the first sensor data.

17. The wearable electronic device of claim 13, wherein generating the representation of the face portion comprises inputting the first data and the second data to a neural network trained to output a 3D mesh representing a shape of the face portion and an image representing a texture of the face portion.

18. The wearable electronic device of claim 17, wherein the operations further comprise inputting live eye camera data and neutral eye camera data to the neural network.

19. The wearable electronic device of claim 18, wherein generating the representation of the face portion comprises determining a change based on the live eye camera data and the neutral eye camera data.

20. The wearable electronic device of claim 17, wherein presenting the representation of the face portion on the outward-facing display of the wearable electronic device comprises:
   generating a live 3D face portion representation by mapping the image to the 3D mesh; and
   generating a view from a viewpoint of the live 3D face portion representation from a viewpoint.

21. The wearable electronic device of claim 20, wherein the view depicts the view such that a viewer at the viewpoint observes the eyes and surrounding portions of the face portion in 3D positions corresponding to their actual 3D positions.

22. The wearable electronic device of claim 20, wherein the viewpoint is determined based on determining a relative position of an observer to the wearable electronic device.

23. A non-transitory computer-readable storage medium, storing program instructions executable on a device including one or more processors to perform operations comprising:
   obtaining first data corresponding to a current appearance of a face portion of a user, the first data based on first sensor data captured via one or more sensors;
   determining that the user is different than another user associated with a user appearance enrollment for the device;
   in accordance with determining that the user is different than the another user associated with a user appearance enrollment for the device, determining to use second data corresponding to a skin tone value and an inter-pupillary distance (IPD) value of the user;
   obtaining the second data corresponding to the skin tone value and the IPD value of the user;
   generating a representation of the face portion based on the first data and the second data; and
   presenting the representation of the face portion on an outward-facing display of a wearable electronic device.

* * * * *